United States Patent Office 3,095,257
Patented June 25, 1963

3,095,257
NITROGEN-CONTAINING POLYVINYL ALCOHOL SHAPED ARTICLES
Kenichi Tanabe and Kanji Matsubayashi, Kurashiki City, Japan, assignors of three-fourths to Kurashiki Rayon Co., Ltd., Okayama Prefecture, Japan, a corporation of Japan, and one-fourth to Air Reduction Company Incorporated, New York, N.Y., a corporation of New York
No Drawing. Filed June 4, 1959, Ser. No. 818,009
Claims priority, application Japan June 9, 1958
2 Claims. (Cl. 8—115.5)

This invention relates to the production of shaped articles of polyvinyl alcohol having improved dyeability. The invention is especially concerned with the production of polyvinyl alcohol filaments having improved dyeing properties.

Polyvinyl alcohol shaped articles such as filaments and films are produced by known methods. Usually such shaped articles show undesirable sensitivity to water, especially hot water. In order to improve the properties of shaped articles such as filaments, the articles are usually subjected to a heat treatment at temperatures in the range of 200–250° C. following by acetalization as with formaldehyde.

Polyvinyl alcohol shaped articles treated as above have inferior dyeing characteristics. Both heat treatment and subsequent acetalization have a deleterious effect on the dyeability of the shaped articles.

It is an object of this invention to provide a method for the production of shaped articles of polyvinyl alcohol characterized by improved dyeing properties.

It is a further object of the invention to produce polyvinyl alcohol filaments of improved dyeability.

Other objects will be apparent from the following description of the invention.

In carrying out the present invention, polyvinyl alcohol shaped articles are prepared from polyvinyl alcohol polymeric material having carbonyl-containing units incorporated therein. Subsequently, the shaped articles are reacted with ammonia or a primary or secondary amine and with hydrogen cyanide or an inorganic cyanide salt. In this way basic nitrogen groups are introduced into the polyvinyl alcohol shaped articles, and the thusly prepared articles have greatly improved dyeing properties.

The polyvinyl alcohol polymeric material having carbonyl-containing units from which the shaped articles are formed can be prepared in various ways. A suitable method comprises partially acetalizing polyvinyl alcohol with an aldehyde or ketone having 2 or more carbonyl groups. Illustrative compounds having 2 or more carbonyl groups useful in the invention include glyoxal, methyl glyoxal, acetylacetaldehyde, levulinic aldehyde, phenyl glyoxal, p-acetylbenzaldehyde, cyclohexanedione-1,4, and the like. The acetalization is preferably carried out in aqueous solution using acid catalyst.

In addition, suitable carbonyl-containing polyvinyl alcohol polymeric material can be prepared from copolymers of vinyl esters such as vinyl acetate with carbonyl-containing comonomers such as methyl vinyl ketone, acrolein, acrolein dimethyl acetal, kentene diacetal, vinyl acetaldehyde dimethyl acetal, and the like by replacing the ester group with a hydroxyl group. Alkali-catalyzed alcoholysis is preferred although other hydrolysis or alcoholysis procedures can be employed.

In practice of the invention, carbonyl-group-containing polymers can also be blended with the polyvinyl alcohol in the spinning solution. Emulsified poly-methylvinyl ketone, polyacrolein or the sodium acid sulfite polyacrolein addition product formed by acrolein polymers in sodium acid sulfite solution and the like can be used.

Partially oxidized polyvinyl alcohol can be employed to form the shaped articles in accordance with the invention. The polyvinyl alcohol is partially oxidized with oxidizing agents such as hypochlorous acid, chlorous acid, alkali metal chlorites and hypochlorites (including bleaching powders), nitric acid, hyponitric acid, potassium permanganate, hydrogen peroxide, acetic acid, ozone, bromine, ammonium persulfate, tertiary butyl hydroperoxide, N-bromo-succinimide, N-chloro-succinimide, and the like. Partial oxidation techniques such as described in copending application Serial No. 787,381, filed January 19, 1959, of Matsumoto et al., now Patent No. 2,983,759, dated May 9, 1961 can be used. As disclosed in lines 3–8 of column 2 of Patent No. 2,983,759, such oxidizing results in the formation of polyvinyl alcohol containing ketone groups and polyvinyl alcohol containing aldehyde groups. Oxidized starch, e.g. starch oxidized with periodic acid, can be used in the invention.

Where the polymer material containing carbonyl groups is acetalized or oxidized polyvinyl alcohol or a vinyl alcohol copolymer, the shaped articles can be prepared directly therefrom. However, it is preferred to blend the carbonyl-containing-polyvinyl alcohol with unmodified polyvinyl alcohol for best results.

The polyvinyl alcohol polymer material containing carbonyl groups should consist of at least about 80 mol percent vinyl alcohol units. The polymer material should contain sufficient carbonyl groups such that upon subsequent reaction of a shaped article formed therefrom with ammonia or a primary or secondary amine and hydrogen cyanide or a cyanide salt the shaped article has good dyeability. Generally, the carbonyl-containing groups should comprise about 0.1 to 20 mol percent and preferably about 0.2 to 10 mol percent of the polymer material.

The carbonyl-group-containing polyvinyl alcohol polymer is formed into shaped articles by known techniques. An especially preferred method of forming filaments from an aqueous polymer solution is described in copending application Serial No. 336,166, filed February 10, 1953, of Tomonari et al., now Patent No. 2,988,802, dated June 20, 1961. Films are preferably cast from aqueous solutions by known techniques. Other methods for forming the shaped articles can be employed.

After formation of the shaped article and before or after subsequent treating steps such as acetalization and the like, the carbonyl-group-containing articles are reacted with ammonia or a primary or secondary amine and with hydrogen cyanide or a cyanide salt thereby to incorporate basic nitrogen groups into the shaped article. In this way shaped articles having improved dyeability are obtained.

Illustrative amines which can be used include methyl amine, ethyl amine, 2-ethyl hexylamine, laurylamine, cyclohexylamine, benzylamine, ethanol amine, glycine, alanine, glutamic acid, ω-amino caproic acid, taurine, dimethyl amine, diethyl amine, lauryl methyl amine, piperidine, diethanol amine, morpholine, and sarcosine, as well as diamines and polyamines such as ethylene diamine, tetramethylene diamine, hexamethylene diamine, piperazine, triethylene tetramine, polyethylene polyamine, polyethylene imine, and the like. Salts of ammonia and the amines such as hydrochloric acid, sulfuric acid, phosphoric acid, hypophosphoric acid, acid sulfite, alkali carbonate, formic acid and acetic acid salts can be used.

Cyanides which are used include hydrogen cyanide and alkali or alkaline earth metal salts thereof such as sodium cyanide, potassium cyanide, calcium cyanide, and the like.

The reaction of the carbonyl-group-containing shaped article with amine and cyanide is preferably carried out by immersing the shaped article in an aqueous solution or a water-alcohol solution containing 1–50% by weight of a mixture of (a) An amine or ammonia together with a molar equivalent or less of hydrogen cyanide, or
(b) A salt of ammonia or an amine together with a molar equivalent amount of a cyanide salt, or
(c) A salt of ammonia or an amine together with a molar equivalent amount of a cyanide salt, and excess ammonia or amine.

Reaction times of several minutes to many hours, usually about 5 minutes to 2 hours at temperatures of 0–100° C., usually 30–70° C., are employed. The shaped articles need not be reacted simultaneously with the amine and cyanide. Alternatively, the shaped articles can be separately reacted with amine and cyanide in either order. Vapor phase reactions of the polyvinyl alcohol article with the amine and cyanide can be employed.

The formation of basic nitrogen groups is believed to proceed by the following reaction:

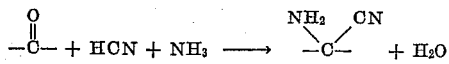

The shaped polyvinyl alcohol articles produced by this invention have greatly improved dyeing characteristics. These articles are readily dyed to a deep color with both acid type dyes and direct dyestuffs. The basic nitrogen groups introduced into the shaped article are highly stable against acid, alkali and hot water.

Dyeability of filaments produced by this invention is greatly superior to that of cotton fibers with direct dyes. With acidic dyes and mordant dyes, the dyeability is comparable with that of wool fibers. Both the amino and cyano radicals introduced by the instant process are believed to contribute to the improved product dyeability.

The following examples illustrate the invention:

EXAMPLE I

A solution comprised of 88 g. polyvinyl alcohol, 8 g. acetylacetaldehyde dimethylacetal, 50 g. sulfuric acid and 1350 g. of water was prepared. The solution was maintained at 70° C. for 3 hours to provide for acetalization of the polyvinyl alcohol. The solution was dialyzed in flowing water. The polyvinyl alcohol obtained had a degree of acetyl acetalization of 5.2%, i.e. 5.2% of the hydroxyl groups were acetalized.

The resulting polyvinyl alcohol was wet spun to form filaments. The filaments were heat treated 3 minutes at 235° C. at constant length. Subsequently the filaments were immersed in an aqueous solution containing by weight 1% ethylenediamine, 1.73% sodium acid sulfite, 0.83% sodium cyanide, and 1% sodium sulfate for 1 hour at 70° C. The fibers were then formalized in an aqueous solution containing by weight 5% formaldehyde, 15% sulfuric acid, and 15% sodium sulfate for 1 hour at 70° C.

The resulting fibers contained 0.71% by weight nitrogen and had good resistance to boiling water. When dyed at 80° C. in an aqueous bath containing 4% weight of fiber of the acid dyestuff Acid Brilliant Scarlet 3R, the fibers completely absorbed the dyestuff and were dyed to a bright deep scarlet. By way of contrast, fibers similarly treated, but without being reacted with the amine and cyanide, had poor dyeability.

EXAMPLE II

A mixture of 188 g. of vinyl acetate and 0.3 g. of benzoyl peroxide was agitated at 60° C. Methyl vinyl ketone in the amount of 16 g. was added dropwise to the mixture over a period of 6 hours. After 12 hours the mixture was poured into water and boiled to remove unreacted monomer.

The copolymer was dissolved in methanol and alcoholized with a 1 N sodium hydroxide and methanol solution. The alcoholized copolymer was washed with methanol. The resulting copolymer had a degree of polymerization of about 300 and contained about 8.2 mol percent methyl vinyl ketone units.

This copolymer was added to a polyvinyl alcohol spinning solution in the amount of 25% by weight of the polyvinyl alcohol. The spinning solution was wet spun to form filaments, which filaments were heat treated 30 seconds at 230° C. and formalized as described in Example I.

The filaments prepared by the invention (Sample B) as well as filaments similarly prepared from just polyvinyl alcohol (Sample C) were treated 30 minutes in an aqueous solution containing by weight 2% ethylene diamine monohydrochloride, and 1% sodium cyanide at 60° C. Properties of the filaments are given in the table below:

Table 1

| Sample | B | C |
| --- | --- | --- |
| Weight percent nitrogen in the filament | 0.45 | 0.01 |
| Shrinkage in boiling water, percent | 4.0 | 3.7 |
| Tenacity, g/denier | 3.5 | 4.0 |
| Absorption of Acid Dyestuff, Percent [1] | 100 | 0 |
| Absorption of Direct Dyestuff, Percent [2] | 100 | 23 |

[1] Same dyeing conditions as described in Example I.
[2] Dyed 1 hour at 80° C. in an aqueous bath containing Nippon Fast Violet BB in the amount of 2% by weight of filaments.

The above results show the greatly improved dyeability resulting from practice of the invention.

EXAMPLE III

A solution of 100 g. of acrolein, 15 g. of dodecyl sulfonic acid, 1.8 g. of ammonium persulfate, and 750 g. of water was agitated at 40° C. Silver nitrate in the amount of 1.14 g. was added to the solution. After 24 hours unreacted monomer was stripped from the mixture with steam and a 62% yield of an emulsion of polyacrolein was obtained. When analyzed with hydroxyl amine hydrochloride, the polymer was found to contain 57 mol percent of carbonyl-containing units. The polyacrolein was added to a polyvinyl alcohol spinning solution in the amount of 5% of the total polymer weight. The spinning solution had a polymer concentration of 35% by weight. The spinning solution was spun to form filaments. Analysis of the filaments with hydroxyl amine hydrochloride showed that the filaments contained 4.90% by weight polyacrolein.

The filaments were roller stretched 100% in 3 seconds at 230° C. and heat shrunk 10% in 3 seconds at 235° C. The filaments were formalized as described in Example I. Then the formalized filaments were treated for 2 hours at 70° C. in an aqueous solution containing by weight 0.2% ethylene diamine, 0.34% sodium acid sulfite, and 0.17% sodium cyanide.

The resulting filaments had high wet heat resistance, and shrinkage in boiling water for 30 minutes was 3.4%. The filaments contained 0.95% by weight nitrogen. When dyed by acid or direct dyestuffs as described in Examples I and II complete dyestuff absorption was obtained and the dyed colors were dry and bright.

EXAMPLE IV

About 1100 g. of polyvinyl alcohol, 40 g. pyridine, and 89 g. N-bromo-succinimide were dissolved in water and reacted for 1 hour at 70° C. The resulting polymer was precipitated in methanol. The oxidized polyvinyl alcohol thus obtained comprised 3 mol percent of carbonyl-group-containing units.

The oxidized polyvinyl alcohol was dissolved with an equal weight of polyvinyl alcohol to form an aqueous solution, and the solution was cast to form a film by known techniques. After heat treatment for 3 minutes at 150° C. the film had high wet heat resistance.

The heat treated film was treated for 1 hour at 50° C. in an aqueous solution containing by weight 5% ammonia, 5.2% sodium acid sulfite, 2.5% sodium cyanide and 15% sodium sulfate. When the resulting film was dyed with the acid dyestuff tartaradin in the amount of 5% by weight of the film at 50° C., the film readily dyed to a yellow color.

We claim:
1. The method for preparing solid shaped polyvinyl alcohol articles having improved dyeability which comprises forming a polymeric material comprised of polyvinyl alcohol and having carbonyl-containing units incorporated therein into a shaped article, said polymeric material consisting of at least 80 mol percent vinyl alcohol units and from about 0.1 to about 20 mol percent carbonyl-containing units, said carbonyl-containing units being a member selected from the group consisting of (a) carbonyl-containing units produced by partially acetalizing polyvinyl alcohol with a member of the group consisting of aldehydes and ketones having up to 9 carbon atoms and containing at least two carbonyl groups selected from the group consisting of aldehyde groups, ketone groups and acetyl groups, wherein at least one of the carbonyl groups is one of the first two members of the aforesaid carbonyl group, (b) carbonyl-containing units produced by co-polymerizing a vinyl ester with a member of the group consisting of vinyl ketone monomers, vinyl aldehyde monomers and vinyl acetal monomers containing up to 6 carbon atoms, and hydrolyzing the resultant copolymer to replace the ester groups with hydroxyl groups of vinyl alcohol, and (c) carbonyl-containing units produced by polymerizing a member of the group consisting of vinyl aldehydes and vinyl ketones containing up to 4 carbon atoms and the sodium sulfite addition products of said vinyl aldehydes, and blending the resultant polymer with polyvinyl alcohol, and treating said shaped article with an aqueous solution containing a compound selected from the group consisting of ammonia, primary and secondary amines having up to 12 carbon atoms in the chain attached to the nitrogen atom of the amine, and water-soluble salts thereof, and a compound selected from the group consisting of hydrogen cyanide, alkali metal cyanides and alkaline earth metal cyanides at a temperature of from 0–100° C. thereby to produce a shaped polyvinyl alcohol article having improved dyeability.

2. The method for preparing polyvinyl alcohol filaments having improved dyeability which comprises forming a polymeric material comprised of polyvinyl alcohol and having carbonyl-containing units incorporated therein into a filament, said polymeric material consisting of at least 80 mol percent vinyl alcohol units and from about 0.1 to 20 mol percent carbonyl-containing units, said carbonyl-containing units being a member selected from the group consisting of (a) carbonyl-containing units produced by partially acetalizing polyvinyl alcohol with a member of the group consisting of aldehydes and ketones having up to 9 carbon atoms and containing at least two carbonyl groups selected from the group consisting of aldehyde groups, ketone groups and acetyl groups, wherein at least one of the carbonyl groups is one of the first two members of the aforesaid carbonyl group, (b) carbonyl-containing units produced by co-polymerizing a vinyl ester with a member of the group consisting of vinyl ketone monomers, vinyl aldehyde monomers and vinyl acetal monomers containing up to 6 carbon atoms, and hydrolyzing the resultant copolymer to replace the ester groups with hydroxyl groups of vinyl alcohol, and (c) carbonyl containing units produced by polymerizing a member of the group consisting of vinyl aldehydes and vinyl ketones containing up to 4 carbon atoms and the sodium sulfite addition products of said vinyl aldehydes, and blending the resultant polymer with polyvinyl alcohol, and treating said filament with an aqueous solution containing a compound selected from the group consisting of ammonia, primary and secondary amines having up to 12 carbon atoms in the chain attached to the nitrogen atom of the amine, and water-soluble salts thereof, and a compound selected from the group consisting of hydrogen cyanide, alkali metal cyanides and alkaline earth metal cyanides at a temperature of from 0–100° C. thereby to produce a polyvinyl alcohol filament having improved dyeability.

References Cited in the file of this patent

UNITED STATES PATENTS

| | | |
|---|---|---|
| 2,960,384 | Osugi | Nov. 15, 1960 |
| 2,992,204 | Osugi | July 11, 1961 |